United States Patent
Wu et al.

(10) Patent No.: US 8,222,793 B2
(45) Date of Patent: Jul. 17, 2012

(54) ACOUSTIC POWER GENERATOR AND METHOD FOR MANUFACTURING THE SAME

(75) Inventors: Liang-Yu Wu, Chiayi (TW); Chia-Ming Liu, Kaohsiung (TW); Lien-Wen Chen, Tainan (TW)

(73) Assignees: Industrial Technology Research Institute, Hsin-Chu (TW); National Cheng Kung University, Tainan (TW)

( * ) Notice: Subject to any disclaimer, the term of this patent is extended or adjusted under 35 U.S.C. 154(b) by 182 days.

(21) Appl. No.: 12/755,815

(22) Filed: Apr. 7, 2010

(65) Prior Publication Data

US 2011/0074245 A1  Mar. 31, 2011

(30) Foreign Application Priority Data

Sep. 25, 2009 (TW) .............................. 98132444 A

(51) Int. Cl.
   *H01L 41/04* (2006.01)
(52) U.S. Cl. .................. 310/311; 310/322; 310/334
(58) Field of Classification Search .......... 310/311, 310/326, 358, 322, 334, 335
   See application file for complete search history.

(56) References Cited

U.S. PATENT DOCUMENTS

| 4,387,318 A | 6/1983 | Kolm et al. |
| 4,857,887 A | 8/1989 | Iten |
| 7,057,476 B2 | 6/2006 | Hwu |
| 7,292,740 B1 | 11/2007 | Barker et al. |
| 2004/0057472 A1 | 3/2004 | Takiguchi et al. |
| 2005/0140465 A1* | 6/2005 | Hwu ........................ 333/187 |

FOREIGN PATENT DOCUMENTS

TW    I228869    3/2005

OTHER PUBLICATIONS

Liang-Yu Wu, Lien-Wen Chen, Chia-Mingliu, Experimental investigation of the acoustic pressure in cavity of a two-dimensional sonic crystal, 2009, p. 1766-1770, Physica B.
Liang-Yu Wu, Lien-Wen Chen, Chia-Mingliu, Acoustic pressure in cavity of variously sized two-dimensional sonic crystals with various filling fractions, 2009, p. 118-1195. Physics Letters A.
Fugen Wu, Zhengyou Liu, Youyan Liu, Splitting and tuning characteristics of the point defect modes in two-dimensional phononic crystals, 2004, p. 066609, Physical Review E.
Po-Wei Huang, Study of the Sound Field Characteristics in Phononic Crystal Using the Boundary Element Method, Jul. 24, 2007.
Kebin Gu, Jyh-Cherng Shieh, Integration and fabrication of 2D phononic crystals and surface acoustic wave micro Devices, Sep. 2006, vol. 15, issue 3.

* cited by examiner

*Primary Examiner* — Derek Rosenau
(74) *Attorney, Agent, or Firm* — WPAT, P.C.; Justin King

(57) ABSTRACT

An acoustic power generator and a method for manufacturing the same. The method comprises steps of: measuring a sonic frequency of a sound wave; determining a phononic crystal and a resonant cavity according to the measured sonic frequency; and determining at least a piezoelectric material according to the measured sonic frequency and installing the piezoelectric material inside the resonant cavity.

16 Claims, 7 Drawing Sheets

20

21 Measure a sonic frequency of a sound wave

22 Design a phononic crystal and a resonant cavity according to the measured sonic frequency 23 Design at least a piezoelectric material according to the measured sonic frequency and install the piezoelectric material inside the resonant cavity

FIG. 2

| Frequency (Hz) | Lattice Constant a (m) | Radius r (m) |
| --- | --- | --- |
| 20 | 9.8 | 3.5 |
| 50 | 3.92 | 1.4 |
| 100 | 1.96 | 0.7 |
| 200 | 0.98 | 0.35 |
| 400 | 0.49 | 0.175 |
| 800 | 0.245 | 0.0875 |
| 1600 | 0.1225 | 0.04375 |
| 2000 | 0.098 | 0.035 |
| 3200 | 0.06125 | 0.021875 |
| 4000 | 0.049 | 0.0175 |
| 5000 | 0.0392 | 0.014 |
| 10000 | 0.0196 | 0.007 |
| 12000 | 0.0163 | 0.00583 |
| 15000 | 0.013067 | 0.004667 |
| 18000 | 0.01089 | 0.003887 |
| 20000 | 0.0098 | 0.0035 |

FIG. 3

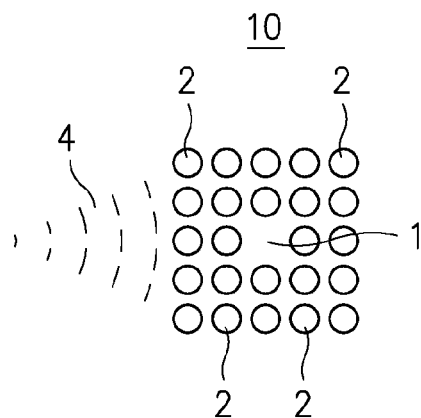
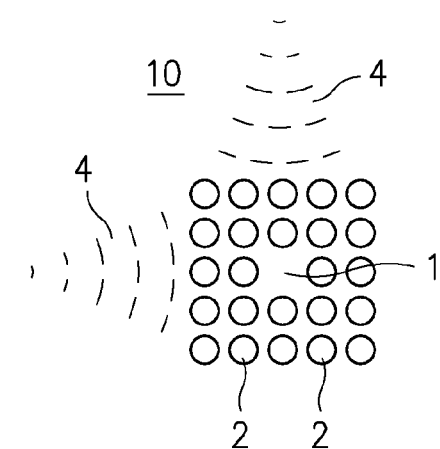
FIG. 6  FIG. 7
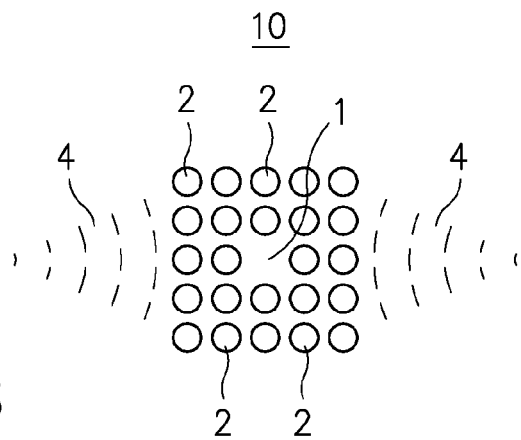
FIG. 8
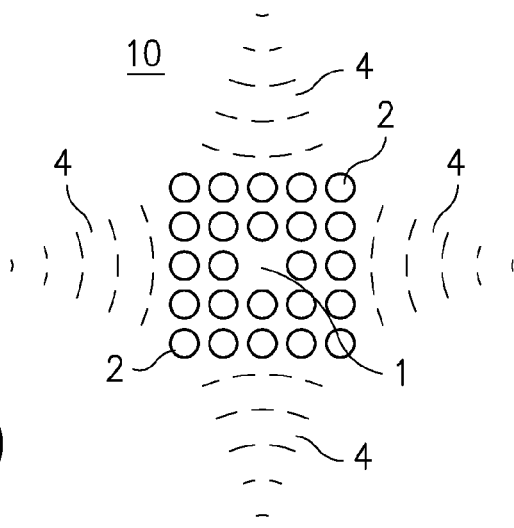
FIG. 9

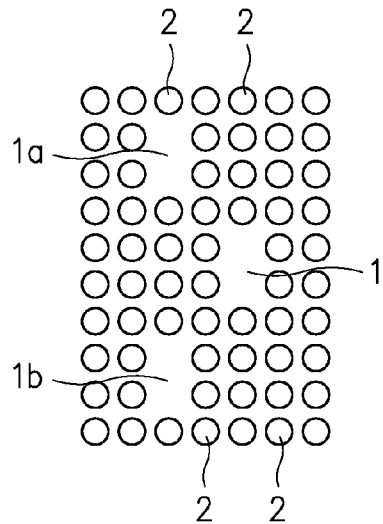
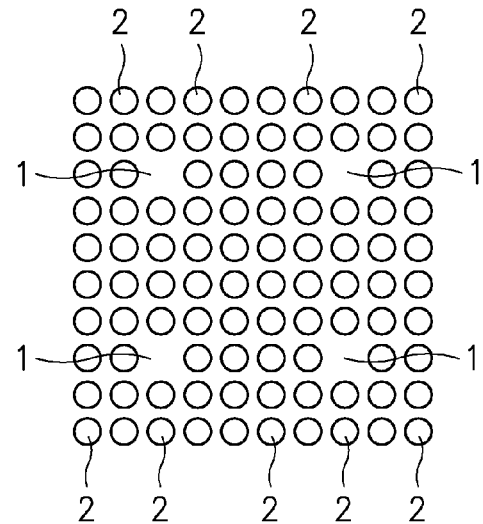
FIG. 14    FIG. 15
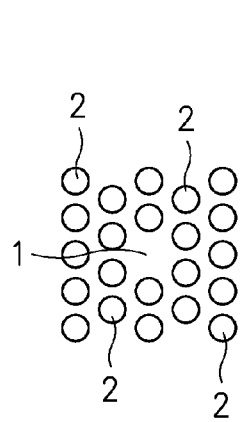
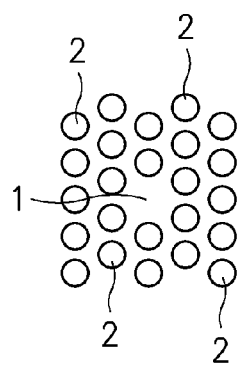
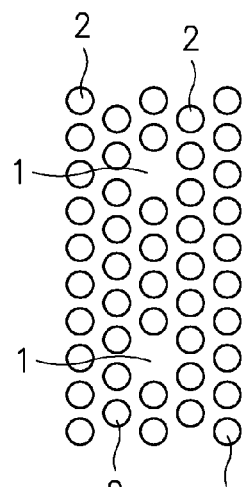
FIG. 16a    FIG. 16b    FIG. 17

ACOUSTIC POWER GENERATOR AND METHOD FOR MANUFACTURING THE SAME

1. TECHNICAL FIELD

The disclosure generally relates to an acoustic power generator and, more particularly, to an acoustic power generator capable of collecting acoustic energy and using the acoustic energy to generate power.

2. TECHNICAL BACKGROUND

There are various sound waves with different frequencies. Noises from the factories, trestles or highways annoy people the most. There are many ways of noise reduction by using, for example, porous glass wool or dual-layered structures. Recently, a phononic crystal is used to reduce noise due to the band gap of a phononic crystal, which can be used in a bulk acoustic wave filter or a surface sonic wave filter to prevent a incoming sonic wave with a specific incoming angle and frequency to achieve noise reduction.

However, noise reduction is relatively passive. In this disclosure, in addition to noise reduction, the acoustic energy of a sound wave can be converted into valuable energy in other format to further achieve environmental protection.

SUMMARY

In view of the above, the disclosure provides an acoustic power generator capable of collecting acoustic energy and using the acoustic energy to generate power.

In one embodiment, the disclosure provides an acoustic power generator, comprising: at least a resonant cavity formed between a plurality of phononic crystals; and at least a piezoelectric material installed inside the resonant cavity.

In one embodiment, the disclosure provides a method for manufacturing an acoustic power generator, comprising steps of: measuring a sonic frequency of a sound wave; determining a phononic crystal and a resonant cavity according to the measured sonic frequency; and determining at least a piezoelectric material according to the measured sonic frequency and installing the piezoelectric material inside the resonant cavity.

BRIEF DESCRIPTION OF THE DRAWINGS

The embodiments of the disclosure will be readily understood by the accompanying drawings and detailed descriptions, wherein:

FIG. 2 is a flowchart of a method for manufacturing an acoustic power generator according to one embodiment of the disclosure;

FIG. 3 is a table showing the relation between the frequency and the corresponding radius "r" and lattice constant "a";

FIG. 6 is a top view of an acoustic power generator in FIG. 1, wherein a sound wave enters the acoustic power generator from one side;

FIG. 7 is a top view of an acoustic power generator in FIG. 1, wherein a sound wave enters the acoustic power generator from two neighboring sides;

FIG. 8 is a top view of an acoustic power generator in FIG. 1, wherein a sound wave enters the acoustic power generator from two opposite sides;

FIG. 9 is a top view of an acoustic power generator in FIG. 1, wherein a sound wave enters the acoustic power generator from four sides;

FIG. 10 to FIG. 17 are top views of an acoustic power generator according to various embodiments of the disclosure.

DETAILED DESCRIPTION OF THIS DISCLOSURE

The disclosure can be exemplified by but not limited to various embodiments as described hereinafter.

Figure 1:
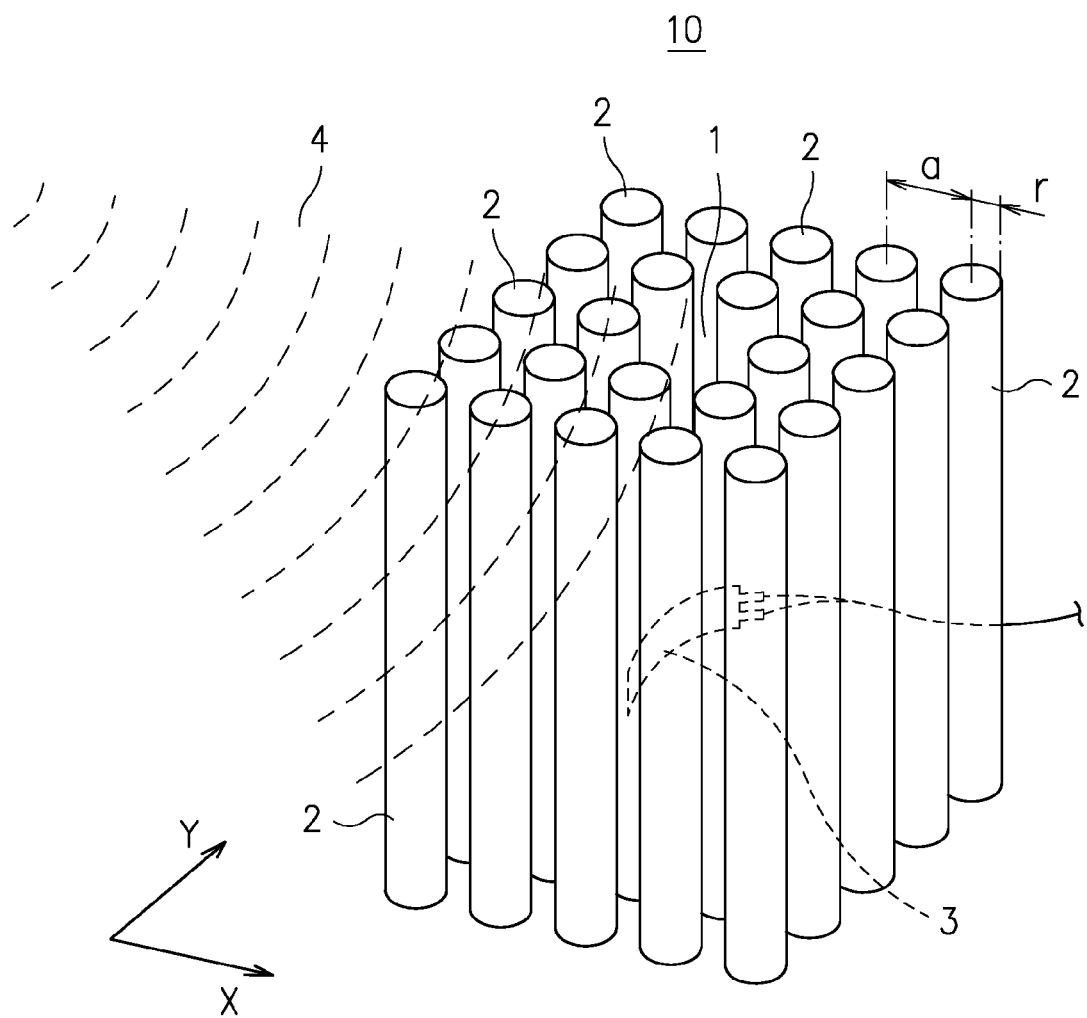
FIG. 1 is a 3-D view of an acoustic power generator according to one embodiment of the disclosure.

Please refer to FIG. 1, which is a 3-D view of an acoustic power generator according to one embodiment of the disclosure. The acoustic power generator 10 comprises at least a resonant cavity 1 formed between a plurality of phononic crystals 2; and at least a piezoelectric material 3 installed inside the resonant cavity 1. A sound wave 4 with a sonic frequency is allowed to enter the resonant cavity 1.

The phononic crystals 2 are cylindrical and have parallel axes. The radius of the phononic crystals 2 is "r", and the lattice constant between the centers of two neighboring phononic crystals 2 is "a". In the present embodiment, the plurality of phononic crystals 2 are arranged in a two-dimensional fashion. In FIG. 1, the plurality of phononic crystals are arranged with identical numbers of phononic crystals along two dimensions. For example, there are five phononic crystals 2 along each of X and Y axes to form a 5×5 array. At the center of the plurality of phononic crystals 2 is formed a vacancy used as a resonant cavity 1.

FIG. 2 is a flowchart 20 of a method for manufacturing an acoustic power generator 10 in FIG. 1 according to one embodiment of the disclosure. The method comprises steps herein.

In Step 21, a sonic frequency of a sound wave 4 is measured.

In Step 22, a phononic crystal 2 and a resonant cavity 1 are determined according to the measured sonic frequency. For example, when the measured sonic frequency of the sound wave 4 in Step 21 is 4000 Hz, the radius "r" and the lattice constant "a" of the phononic crystals 2 can be determined by a plane wave expansion method and the resonant cavity 1 can be determined by a finite element method. For example, the number and arrangement of the phononic crystals 2 and the arrangement of the resonant cavity 1 can be determined in this step. More particularly, when a sound wave 4 enters the resonant cavity 1, the acoustic energy is collected in the resonant cavity 1 to induce a first resonant frequency. Please refer to FIG. 3, which is a table showing the relation between the frequency and the corresponding radius "r" and lattice constant "a". More particularly, when the frequency is 4000 Hz, the lattice constant "a" is 0.049 m, and the radius "r" is 0.0175 m. The data displayed in FIG. 3 is obtained when there are five phononic crystals 2 along each of X and Y axes with a vacancy as a resonant cavity at the center, as shown in FIG. 1.

Figure 4:
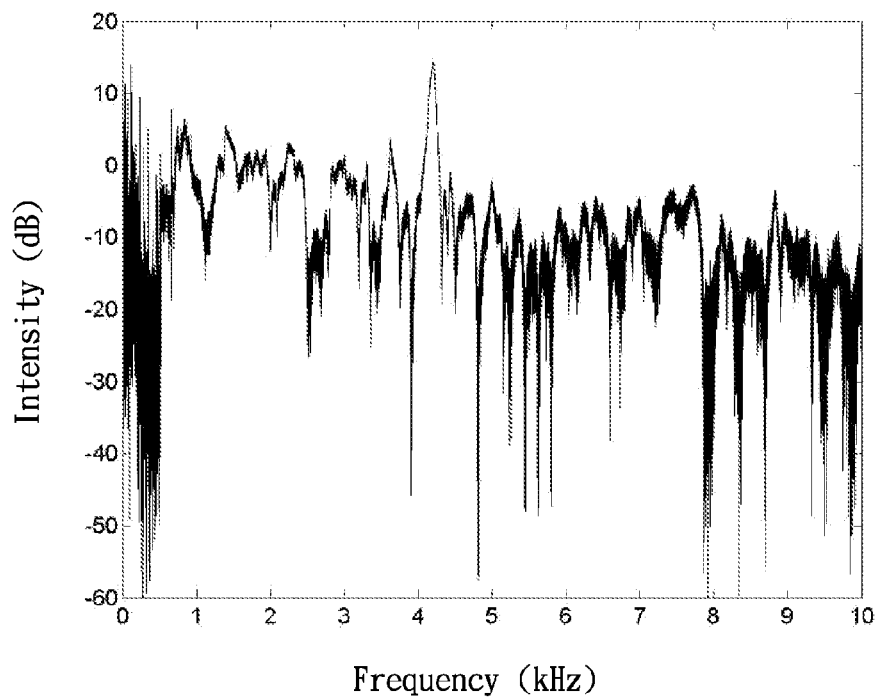
FIG. 4 is a spectrum of intensity v.s. frequency of the resonant cavity of phononic crystals according to the disclosure.
Figure 5:
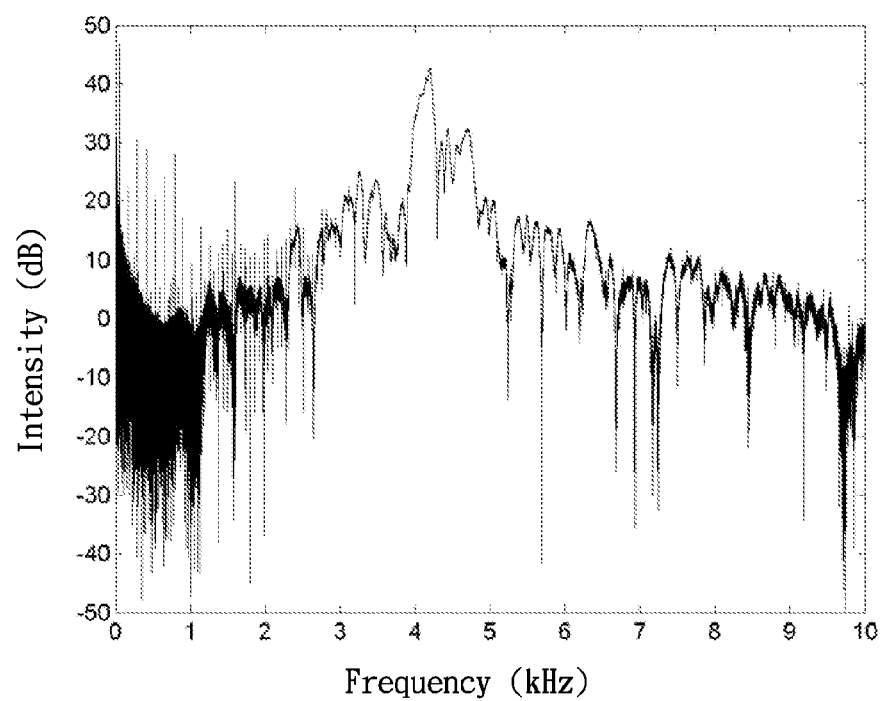
FIG. 5 is a spectrum of intensity v.s. frequency of the piezoelectric material according to the disclosure.

In Step 23, at least a piezoelectric material 3 is determined according to the measured sonic frequency and the piezoelectric material 3 is installed inside the resonant cavity 1 (as shown in FIG. 1). The piezoelectric material 3 is determined by a finite element method or the like. For example, the number and arrangement (vertical, horizontal or inclined) of the piezoelectric materials 3 inside the resonant cavity 1 can be determined. However, this disclosure is not limited to the size and shape of the piezoelectric material 3. In the present embodiment, the piezoelectric material 3 is rectangular and bended as an arc. The piezoelectric material 3 may comprise materials such as leadzirconatetitanate (PZT), quartz, tourmaline, Rochelle salt, tantalate, niobate, zinc oxide (ZnO) or polyvinylidene fluoride (PVDF). More particularly, when a sound wave 4 enters the resonant cavity 1, the resonant cavity 1 induces a first resonant frequency and the piezoelectric material 3 is driven to induce a second resonant frequency. The second resonant frequency and the first resonant frequency are essentially identical. Referring to FIG. 4 and FIG. 5 for the spectrum of intensity v.s. frequency of the phononic crystals 1 and piezoelectric material 3 according to the disclosure, the first resonant frequency is about 4210 Hz and the second resonant frequency is about 4200 Hz.

Accordingly, the resonant frequencies for the resonant cavity 1 and the piezoelectric material 3 are essentially identical. Moreover, the resonant frequencies are essentially identical to the sonic frequency of the sound wave 4. In other words, when the sound wave 4 enters the resonant cavity 1, the acoustic energy of the sound wave 4 is collected inside the resonant cavity 1 and is converted into electric energy by vibrating the piezoelectric material 3. When the resonant cavity 1, the piezoelectric material 3 and the sound wave 4 have essentially the same frequency, largest power can be generated. It is noted that the acoustic power generator 10 still works to generate relatively less power even when the resonant cavity 1, the piezoelectric material 3 and the sound wave 4 do not have the same frequency.

Please refer to FIG. 6 to FIG. 9, which show top views of an acoustic power generator in FIG. 1, wherein a sound wave 4 enters the acoustic power generator 10 in different ways. In FIG. 6, the sound wave 4 enters the acoustic power generator 10 from the left side. Ideally, the sound wave 4 is completely isolated and collected in the resonant cavity 1 in the acoustic power generator 10. In this disclosure, the acoustic energy of the sound wave 4 is collected inside the resonant cavity 1 and is converted into electric energy. Therefore, this disclosure is not limited by how the sound wave 4 enters the acoustic power generator 10. Experimentally, when the sound wave 4 enters the acoustic power generator 10 from two neighboring sides (as shown in FIG. 7) or two opposite sides (as shown in FIG. 8), the resonant intensity is twice the resonant intensity when the sound wave 4 enters the acoustic power generator 10 from one side (in FIG. 6). When the sound wave 4 enters the acoustic power generator 10 from four sides (as shown in FIG. 9), the resonant intensity increases to four times the resonant intensity in FIG. 6.

Figure 10:
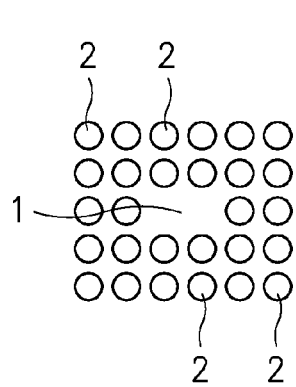
Figure 11A:
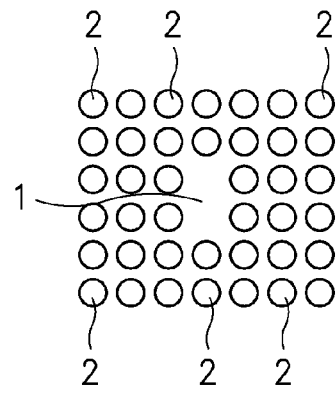
Figure 11B:
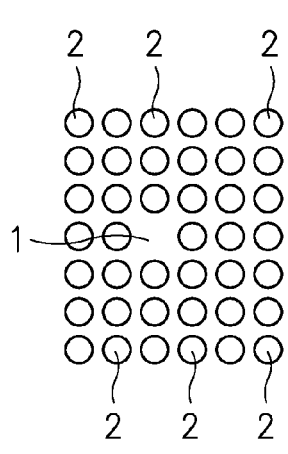
Figure 12:
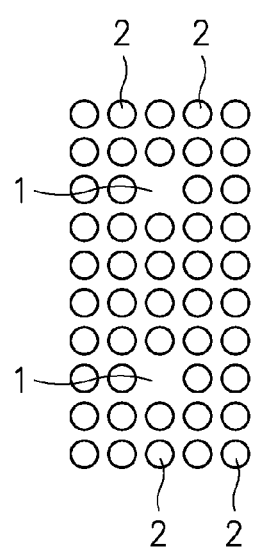
Figure 13:
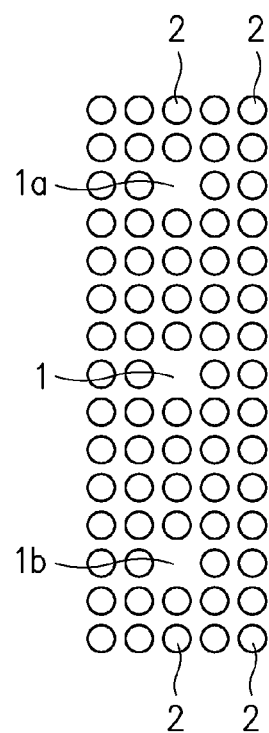

Please refer to FIG. 10 to FIG. 17, which are top views of an acoustic power generator according to various embodiments of the disclosure. In FIG. 10 to FIG. 15, the plurality of phononic crystals 2 are alignedly arranged in a two-dimensional fashion. In FIG. 10 to FIG. 14, the plurality of phononic crystals are arranged with non-identical numbers of phononic crystals along two dimensions. In FIG. 15, the plurality of phononic crystals are arranged with identical numbers of phononic crystals along two dimensions. In FIG. 10, the plurality of phononic crystals 2 form a 6×5 array with two phononic crystal vacancies as a resonant cavity 1. In FIG. 11a, the plurality of phononic crystals 2 form a 7×6 array with two phononic crystal vacancies as a resonant cavity 1. In FIG. 11b, the plurality of phononic crystals 2 form a 6×7 array with one phononic crystal vacancy as a resonant cavity 1 located essentially at a central position of the plurality of phononic crystals 2. In FIG. 12, the plurality of phononic crystals 2 form a 5×10 array with two phononic crystal vacancies as two resonant cavities 1 located symmetrically with respect to a central position of the plurality of phononic crystals 2. In FIG. 13, the plurality of phononic crystals 2 form a 5×15 array with three phononic crystal vacancies as three resonant cavities 1, 1a, 1b, wherein the resonant cavity 1 is located at a central position of the plurality of phononic crystals 2 and the other two resonant cavities 1a, 1b are located symmetrically with respect to the resonant cavity 1 at the central position of the plurality of phononic crystals 2. In FIG. 14, the plurality of phononic crystals 2 form a 7×10 array with six phononic crystal vacancies divided into three resonant cavities 1, 1a, 1b, wherein the resonant cavity 1 is located at a central position of the plurality of phononic crystals 2 and the other two resonant cavities 1a, 1b are located symmetrically with respect to the central position of the plurality of phononic crystals 2. More particularly, the resonant cavities 1a, 1b and the resonant cavity 1 are located deviatedly. In FIG. 15, the plurality of phononic crystals 2 form a 10×10 array with four phononic crystal vacancies as four resonant cavities 1 forming a 2×2 array located symmetrically with respect to the central position of the plurality of phononic crystals 2. Moreover, in FIG. 16a, FIG. 16b and FIG. 17, the plurality of phononic crystals 2 are deviatedly arranged. In FIG. 16a and FIG. 17, the plurality of phononic crystals 2 are arranged with non-identical numbers of phononic crystals along two dimensions; the plurality of phononic crystals 2 are arranged with identical numbers of phononic crystals along two dimensions in FIG. 16b. In FIG. 16a and FIG. 16b, the plurality of phononic crystals 2 are arranged with one phononic crystal vacancy as a resonant cavity 1. In FIG. 17, the plurality of phononic crystals 2 are arranged with two phononic crystal vacancies as two resonant cavities 1 located symmetrically with respect to the central position of the plurality of phononic crystals 2.

Figure 18:
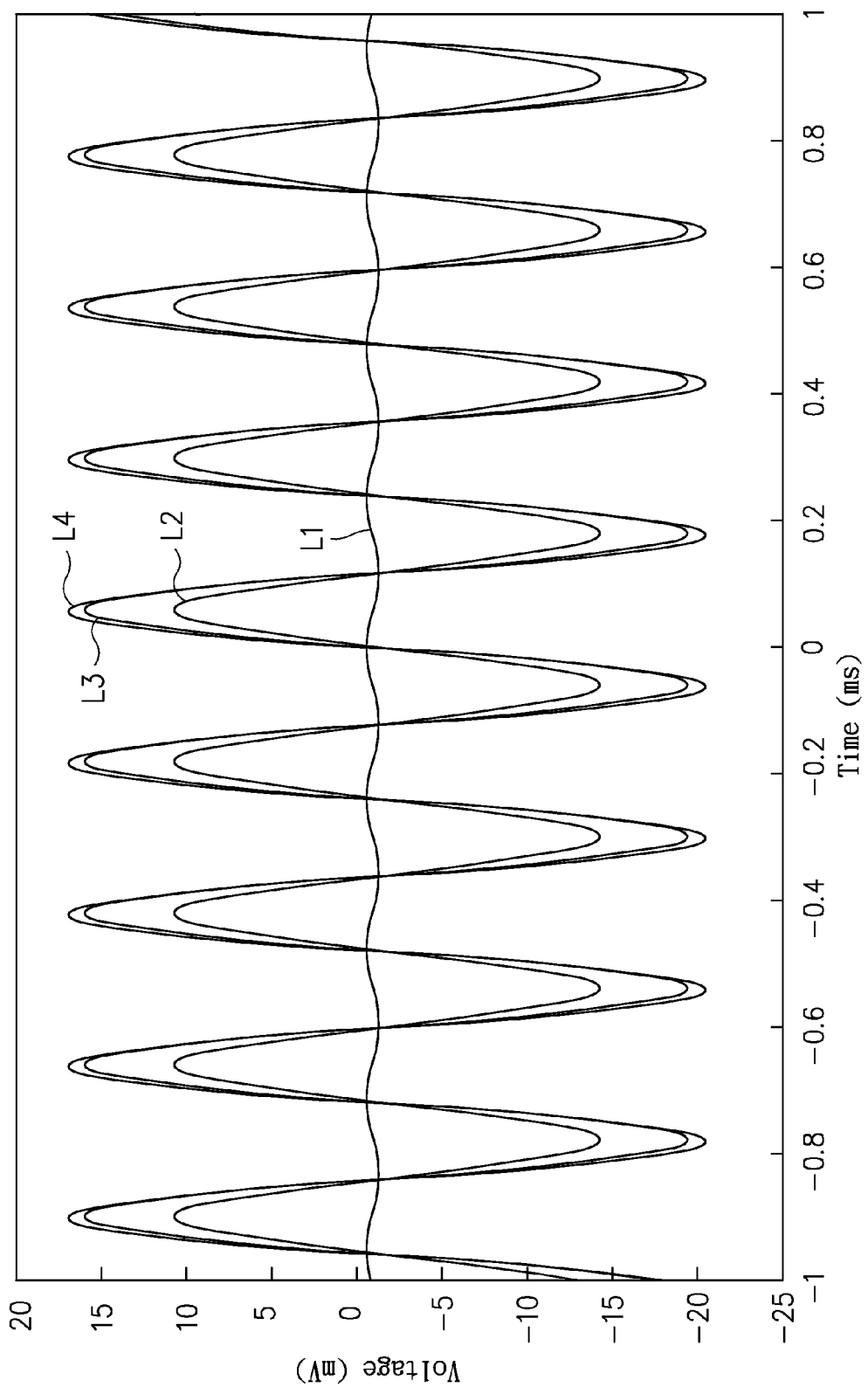
FIG. 18 shows the relation between the output voltage of a piezoelectric material and the design of phononic crystals.

FIG. 18 shows the relation between the output voltage of a piezoelectric material and the design of phononic crystals. In FIG. 18, curve L1 indicates a condition where there is no phononic crystal; curve L2 indicates that the phononic crystals are arranged as a 5×5 array (as shown in FIG. 1), and curves L3, L4 both indicate that the phononic crystals are arranged as a 6×7 array with one phononic crystal vacancy (as shown in FIG. 11b) where the sonic frequency is 4200 Hz for curve L3 and 4180 Hz for curve L4. Considering that the sound wave 4 enters the acoustic power generator from the side near the phononic crystal vacancy (as shown in FIG. 11b), FIG. 18 shows that the phononic crystals significantly increase the output voltage of the piezoelectric material and that the output voltage depends on the arrangement of the phononic crystals. As indicated by curve L3, L4, the output voltage depends on the input sonic frequency.

In view of the above, the acoustic power generator of this disclosure uses phononic crystals and piezoelectric materials as an acoustic energy collector to collect acoustic energy in the phononic crystal vacancy as a resonant cavity to further confine and convert the acoustic energy into electric energy when the sonic frequency approaches the resonant frequency. The disclosure is therefore novel, non-obvious and useful.

Although this disclosure has been disclosed and illustrated with reference to particular embodiments, the principles involved are susceptible for use in numerous other embodiments that will be apparent to persons skilled in the art. This disclosure is, therefore, to be limited only as indicated by the scope of the appended claims.

What is claimed is:

1. An acoustic power generator, comprising:
   at least a resonant cavity completely enclosed within a plurality of phononic crystals; and
   at least a piezoelectric material installed inside the resonant cavity.

2. The acoustic power generator as recited in claim 1, wherein each resonant cavity and each one piezoelectric material are arranged such that when a sound wave enters each resonant cavity, the sound wave causes each resonant cavity to induce a first resonant frequency that is essentially identical to a second resonant frequency induced by the corresponding piezoelectric material inside that particular resonant cavity.

3. The acoustic power generator as recited in claim 1, wherein the plurality of phononic crystals are arranged in a two-dimensional fashion.

4. The acoustic power generator as recited in claim 3, wherein the plurality of phononic crystals are alignedly arranged.

5. The acoustic power generator as recited in claim 3, wherein the plurality of phononic crystals are deviatedly arranged.

6. The acoustic power generator as recited in claim 3, wherein the plurality of phononic crystals are arranged with identical numbers of phononic crystals along two dimensions.

7. The acoustic power generator as recited in claim 3, wherein the plurality of phononic crystals are arranged with non-identical numbers of phononic crystals along two dimensions.

8. The acoustic power generator as recited in claim 1, wherein the plurality of phononic crystals are cylindrical.

9. The acoustic power generator as recited in claim 8, wherein the plurality of phononic crystals have parallel axes.

10. The acoustic power generator as recited in claim 1, wherein the plurality of phononic crystals are arranged to form a resonant cavity therebetween and the resonant cavity is located at a central position of the plurality of phononic crystals.

11. The acoustic power generator as recited in claim 1, wherein the plurality of phononic crystals are arranged to form two resonant cavities therebetween and the two resonant cavities are located symmetrically with respect to a central position of the plurality of phononic crystals.

12. The acoustic power generator as recited in claim 1, wherein the plurality of phononic crystals are arranged to form a plurality of resonant cavities therebetween and the plurality of resonant cavities are located deviatedly.

13. The acoustic power generator as recited in claim 1, wherein the plurality of phononic crystals are arranged to form a plurality of resonant cavities therebetween and the plurality of resonant cavities are located as an array.

14. The acoustic power generator as recited in claim 1, wherein the piezoelectric material comprises lead zirconate titanate (PZT), quartz, tourmaline, Rochelle salt, tantalate, niobate, zinc oxide (ZnO) or polyvinylidene fluoride (PVDF).

15. An acoustic power generator, comprising:
    at least a resonant cavity completely enclosed within a plurality of phononic crystals; and
    at least a piezoelectric material installed inside the resonant cavity;
    wherein the plurality of phononic crystals are arranged to form two resonant cavities therebetween and the two resonant cavities are located symmetrically with respect to a central position of the plurality of phononic crystals.

16. An acoustic power generator, comprising:
    at least a resonant cavity completely enclosed within a plurality of phononic crystals; and
    at least a piezoelectric material installed inside the resonant cavity;
    wherein the plurality of phononic crystals are arranged to form a plurality of resonant cavities therebetween and the plurality of resonant cavities are located deviatedly.

* * * * *